Jan. 26, 1932.  H. L. RAMBO ET AL  1,842,425
FEED MECHANISM FOR MACHINE TOOLS
Filed Aug. 5, 1925   5 Sheets-Sheet 1

INVENTOR.
BY
ATTORNEY.

Jan. 26, 1932.   H. L. RAMBO ET AL   1,842,425
FEED MECHANISM FOR MACHINE TOOLS
Filed Aug. 5, 1925   5 Sheets-Sheet 3

INVENTOR.
Harry L. Rambo, Thomas Oldham
BY George Largen
Allen Keller
ATTORNEY.

Fig. 11

Jan. 26, 1932.  H. L. RAMBO ET AL  1,842,425
FEED MECHANISM FOR MACHINE TOOLS
Filed Aug. 5, 1925   5 Sheets-Sheet 5

Fig.12.

INVENTOR.
Harry S. Rambo, Thomas Adream
BY George Sawyer
Allen Allen
ATTORNEY.

Patented Jan. 26, 1932

1,842,425

UNITED STATES PATENT OFFICE

HARRY L. RAMBO, THOMAS ADDISON, AND GEORGE LANGEN, OF CINCINNATI, OHIO, ASSIGNORS TO THE CINCINNATI PLANER COMPANY, OF CINCINNATI, OHIO, A CORPORATION OF OHIO

FEED MECHANISM FOR MACHINE TOOLS

Application filed August 5, 1925. Serial No. 48,378.

Our invention relates to control mechanisms for machine tools and particularly for metal planers, as applied to the operation of the tool feeds.

In describing our invention we will point out its features in connection with the operation of the trigger gears usually employed in connection with the feed screws on the rails and side heads of metal planers, although this is but one mode of application of our invention.

We have as an object the provision of a very easily adjustable mechanism whereby the exact amount of feed motion applied to the screws can be controlled by the operator and we employ the principle of a fixed stop, an adjustable stop and a stop arranged in connection with the transmission in the side head or rail, whereby the motion of the transmission is controlled by the distance between the said adjustable and fixed stops.

It is our object to provide for a friction clutch type of feed in the side heads or rails, and to release the friction by means of the stop mechanism, while leaving sufficient friction applied to the transmission to reverse the movement of the parts when the planer reverses.

It is our object to provide a novel mechanism whereby the adjustment of the movable stop is arranged, which mechanism is self locking, may be manipulated without any preparatory adjustments of parts, by the revolving of a single centrally located handle, and in which the scope of movement will not normally be changed during the operation of the planer after one stop has come into play.

We have illustrated our invention in connection with a side head and a single trigger gear, and it will be sufficient for those skilled in the art to state that the drive can be applied to as many trigger gears as desired, and that rapid traverse as applied by suitable clutches can be easily incorporated into the drive.

In addition to the above, our adjustable element in and of itself has application to the mechanical arts because of the novel radial sliding toothed dogs, by means of which the adjustable element is released and locked in a large number of positions, without particular manipulation and which in addition provides for a very large number of possible positions, and an easy mode of calibration.

Other objects and advantages will be set forth below wherein we more fully describe and point out the construction and arrangement of parts of our invention, and the novelty of which we will set forth in the appended claims.

Referring first to the theory of an adjustable feed device in metal planers, the operating shaft is driven with the planer table, and makes a given number of revolutions forward and reverse each time the table moves back and forth, these revolutions being determined in number by the distance which the table is permitted to travel. It becomes necessary to provide means on the side and rail heads to convert the motion of the shaft to intermittent unidirectional rotations either forward or reverse, on the feed screws of the machine, and in so converting to adjust the exact amount of rotation of the feed screws so as to give the desired movement to the tool.

The method of converting the to-and-fro motion of the energizing shaft to intermittent motion in either direction is accomplished by means of a gear which meshes with the usual trigger gears. The trigger gears have a shiftable pawl, whereby motion in one direction displaces the pawl, and motion in the other drives the feed screws by means of the pawl, and whereby the shifting of the pawl controls which direction the drive becomes effective.

The method of controlling the amount of movement in the desired direction of the trigger gear is accomplished by a friction clutch applied to the energizing shaft and to the gear that operates the trigger gears, which clutch is released automatically by an adjustable mechanism within the gear box and manually controlled from without the box, which mechanism comes into play before the work on the planer table has reached the tools controlled by the feed screws.

Figure 1:
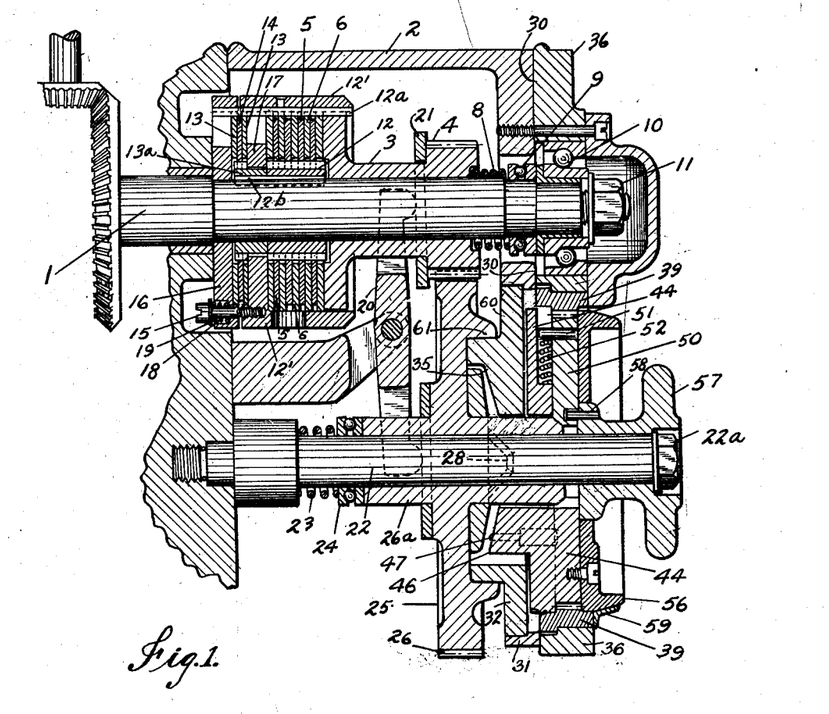
Figure 1 is a central vertical section showing the feed control devices.

Referring now to the drawings, the power or energizing shaft indicated at 1 is rotated oppositely in time with the planer table. On this shaft, within the box 2 on the side head or rail head, is mounted a sleeve 3 having a toothed portion at its outer end forming a gear 4. The friction clutch between the shaft and the sleeve is formed of two parts. The main part is formed of interposed friction discs 5 and 6.

The discs 5 are secured to a collar 12 which is keyed by 12b to the shaft 1, and the discs 6 are engaged within the outer casing portions 12' of the clutch, by means of keys 12a, which keys also serve to couple the flange of the sleeve 3, slidably but nonrotatably with the said outer casing portion. Mounted loosely over the shaft 1 at the outer end of the sleeve is a heavy spring 8 which bears against the roller thrust bearing 9 on the shaft. Beyond the roller bearing is a radial thrust bearing 10, and at the end of the shaft a suitable nut 11. By means of this arrangement, the sleeve is thrust rearwardly along the shaft by the spring, and the flange on the sleeve presses against the disc assembly and compresses the same, resulting in the shaft driving the sleeve, through the collar discs engaging the discs on the casing portion, and the casing portion driving the sleeve through its keyed relation with the collar thereon. When the sleeve is moved against the spring action, the disc assembly is freed from pressure, and the sleeve is not positively driven, and the discs are freed from pressure on each other.

The other part of the clutch is formed of a collar 13a keyed on the shaft 1 by the same key 12b as the other collar, which collar 13a carries a friction disc 14. A pair of friction discs 13, 13, are engaged by the keys in the outer casing portion, and the casing portion has a hub plate portion 17, which rotatably engages the collar 13a.

An end plate 16 is employed, which plate is rotatable on the shaft 1, and this end plate is secured at several points to the hub plate portion of the clutch casing by means of threaded pins 15, which engage in the extending portion 17 and casing portion 12', and have flanged heads 19, behind which springs 18 are located. These springs pull the clutch casing toward the end plate 16, and thus act to hold the discs 13 and 14 together, so that the collar 13a through the medium of the discs will drive the clutch housing and through it the sleeve.

The object of this double arrangement is to leave enough residual friction in the clutch so that when the main drive gear is brought to a stop by releasing the friction, and positively stopping the gear as well, and the machine then reverses, the reverse rotation of the shaft in consequence thereof will have enough power to move the gear away from stopped position in the opposite direction.

Figure 4:
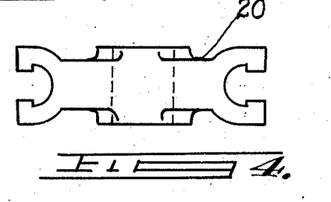
Fig. 4 is an elevation of the friction release lever.
Figure 5:
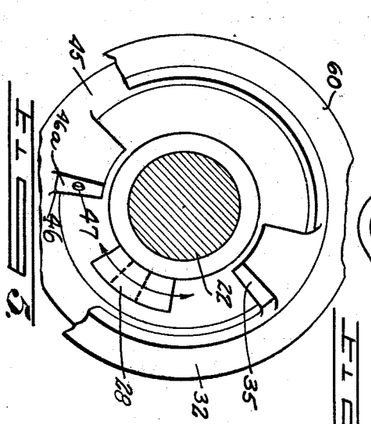
Fig. 5 is a diagram of the location of the several stops.

The shifting of the friction clutch is accomplished by means of a forked lever 20 (Figure 4) which bears on the plate 21, set over the sleeve and in abutment with the gear end thereof.

The drive

Arranged in the gear box is a shaft 22 which extends out through the front of the box.

The shaft has mounted thereon at its inner end a spring 23, and a thrust bearing 24, against which the spring bears. Mounted on the shaft is a large gear 25, having teeth 26, which gear has a hub 26a rotatable on the shaft and against which the spring 23 exerts a pressure to keep the gear forwardly of the shaft. The lever 20 has a forked end lying just behind the gear 25, so that when the gear is pushed back against the spring tension, the lever will rock, and shift the clutch to released position.

Figure 11:
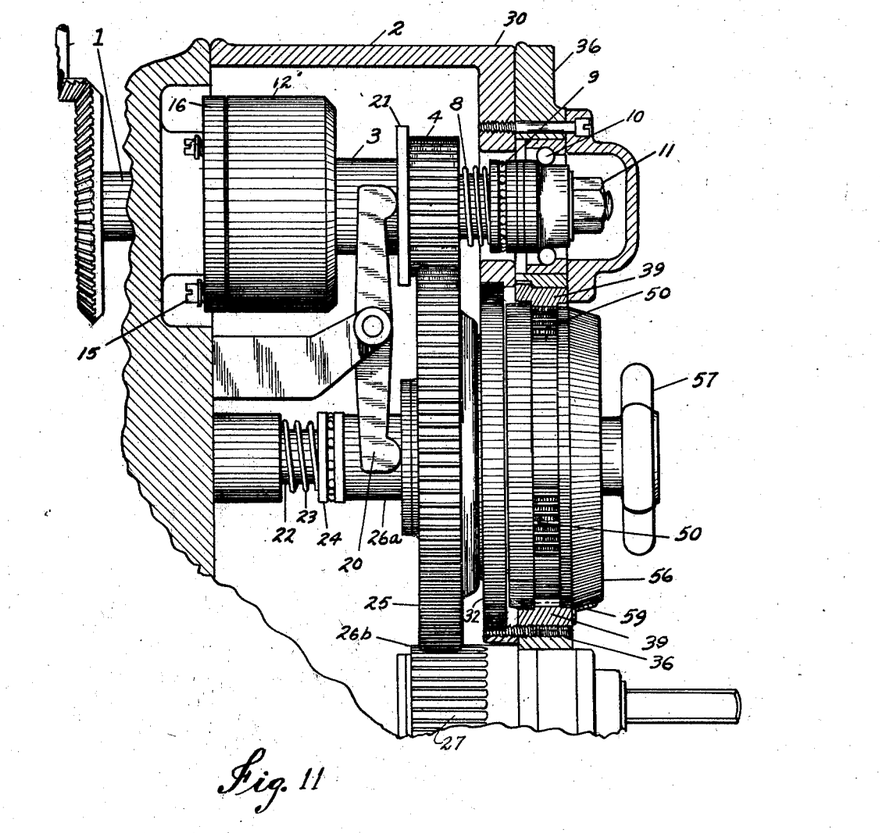
Fig. 11 is an elevation taken from the side of the device with casing portions broken away.
Figure 12:
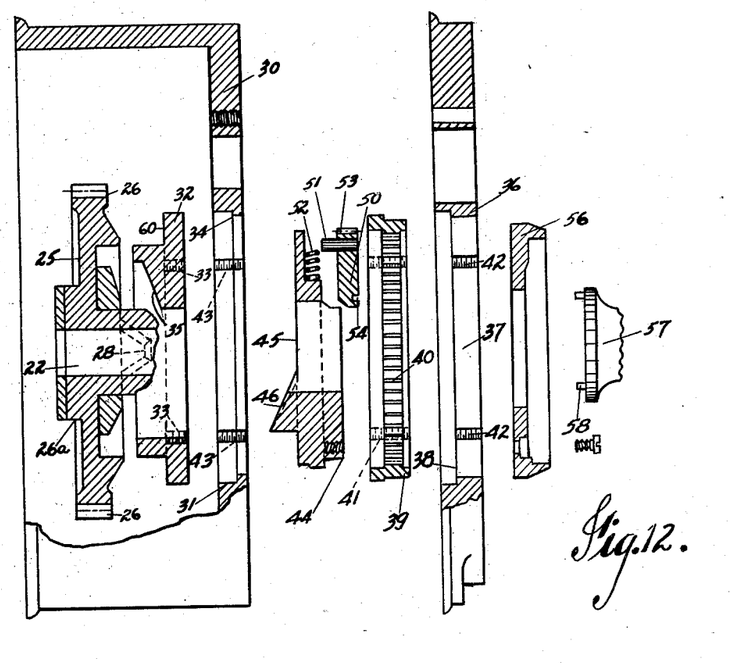
Fig. 12 is an exploded view of the adjusting mechanism shown in Fig. 1.

Mounted in the gear box are trigger gears of which a part of one is shown in Fig. 11. The outer toother portions 26b of the trigger gears, however many there are, mesh with the teeth of the large gear and the teeth on the trigger gears are long enough to permit the sliding motion of the large gear.

We have not shown the trigger gear arrangements as it is old to operate a set of trigger gears from a common large size gear in the manner indicated only in the drawings. The trigger gear or gears form part of the feed mechanism of the machine, and are effective to transmit motion to the feed screws of the machine (not shown).

For moving the gear along the shaft it is provided with a forwardly tapered and laterally beveled stop lug 28, that projects from the hub.

The adjustable element

Figure 2:
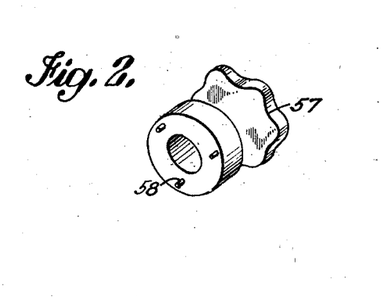
Fig. 2 is a perspective view of the operating handle.
Figure 3:
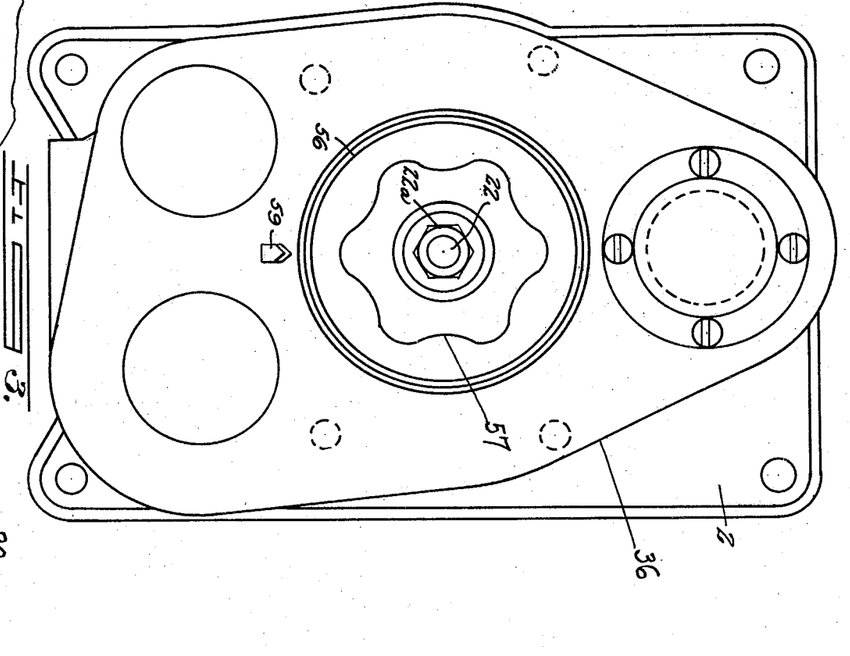
Fig. 3 is an elevation of the gear case or feed box showing the relation of the several centers.

Referring first to the assembly arrangements, we have illustrated the parts in separation in Figure 2, so as to explain the particular structure of our invention. The front face 30 of the gear box has an aperture 31 therein, within which is arranged a ring 32, having peripheral holes or grooves for retaining screws as indicated at 33. This ring seats against a flange 34 in the face of the gear box, and has an inwardly projecting lug or stop 35, with one face tapered.

A cover plate 36 is provided which engages and is bolted to the face of the gear box. This plate has an annular opening 37 therein. In this opening and seated against the shoulder 38 of the opening is the fixed ring 39, having a toothed internal hub 40. Screws which engage in half round threaded openings 42 in the opening 37 of the cover plate, and in half round threaded holes in the periphery of the ring, serve to lock this ring in place. As will be noted also, the ring portion 32 has grooves which engage the same screws, thus holding the rings 39 and 32 in fixed relation together with the housing. There are channels 43 in the gear box ahead, which engage these same screws when positioned in engagement in the grooves 33 in the ring 32.

Figure 7:
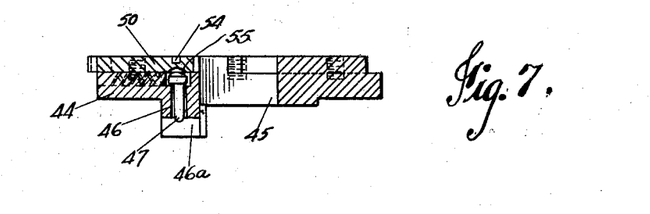
Fig. 7 is a section on line 7—7 of Fig. 6.

We provide a control disc or stop disc 44, which has a hole 45 for the shaft 22, and an extended inner portion which engages behind the toothed rib on the internal gear ring 39. It has on its inner face a lug 46, which serves as a stop and has a sliding pin 47 parallel with the axis of the shaft 22. The pin is mounted in the tapered face 46a of the lug (Figure 7).

Figure 6:
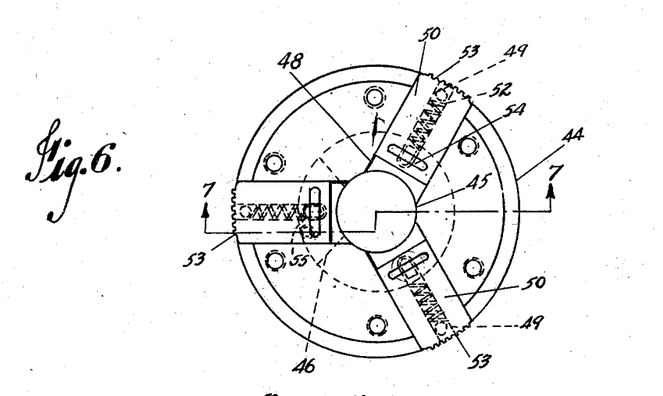
Fig. 6 is a plan view of the adjustable stop disc with the dogs shown in place.
Figure 8:
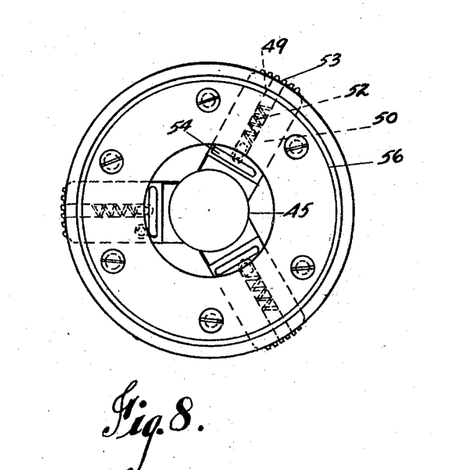
Fig. 8 is an elevation of the cover plate for the adjustable stop disc with the dogs shown in position thereon.
Figure 9:
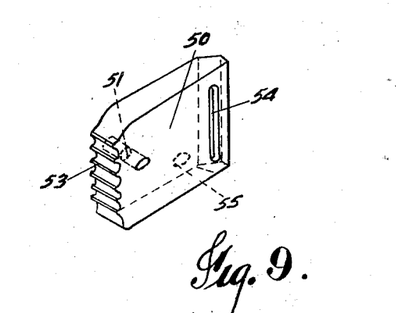
Fig. 9 is a perspective of one of the two dogs.
Figure 10:
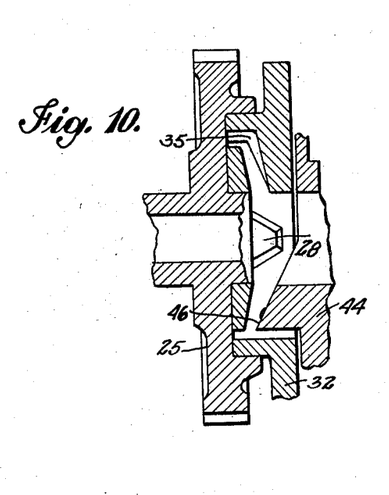
Fig. 10 is a section showing relation between certain of the elements of Fig. 1.

Arranged in the control disc are in this instance three radial pockets 48, having spring channels 49 in the base thereof. (See Figures 6 and 8.) These pockets are equipped with sliding dogs 50, which have pins 51 that lie in the spring channels, and are engaged and pushed outwardly by the springs 52 therein. The outer ends of the dogs are toothed at 53, and the position of the parts brings the dogs into position of meshing with the internal gear rib 40.

The dogs also have crosswise grooves 54 therein by means of which they are manipulated. The dog that lies over the stop lug has a recess 55 therein, which, when the said dog is in mesh with the internal gear, will lie over the end of the pin 47, so that the pin will restrict movement of the dog if it is pressed outwardly through the lug.

This last noted mechanism, as will be noted, restrains the adjustable element when the main gear is in position with its stop lug against the stop lug on the adjustable stop disc.

A cover plate 56 is screwed to the outer face of the disc 44, and holds the dogs in place. A handle is provided which is arranged to rotate over the end of the shaft 22, and is held in place by the nut 22a on the end of this shaft. The handle has a body 57 and three inwardly projecting pins 58, which are located so as to be arranged in the grooves 54 of the three dogs. The side edge of the cover plate may be provided with calibrations, and an indicator finger 59 mounted on the gear box cover plate is arranged to register zero on the calibrations when the lug 28 on the main gear is held fast between the lug 46 on the control disc and the lug 35 on the inner ring 32.

The inner ring 32 is preferably formed with a flange 60 which engages within a flange 61 on the main gear, and provides thereby a steady support and bearing for the said gear.

The adjustable element operates as follows:—

With the parts arranged in normal way, the three lugs 28, 46 and 35, are lying in part in the same plane so that when the main gear with its lug 28, is revolved by means of the friction clutch, its lug will contact with one or the other of the lugs 46 and 35. This contact will push the gear along on the shaft 22, and thus will rock the lower end of the control lever, which lever will open up the friction clutch. By the time the friction clutch is open the lug 28 will be carried to a definite uniform position against one or the other of the two lugs, a result assured by the residual friction remaining in the residual clutch members 13 and 14 acting through the gears 4 and 25.

Upon reversal of the energizing shaft, the residual friction clutch will provide power for reversing the movement of the gear, whereupon the lug 28 will ride down from the lug against which it is stopped, and will at the same time be pressed outwardly by its spring, thereby permitting the lever to give way to the spring that controls the main friction clutch element, and thereupon the main friction will come into play and move the gear around until the other of the two stops brings about a repetition of the action now described.

When the operator desires to set the adjustable stop 46, he grasps the handle 57, and turns it in either direction he desires. The first result of the revolution will be to pull the dogs on the control disk away from the internal gear with which they normally mesh. Thereupon the control disc will be free to rotate under the rotation applied to the handle to the desired point. As soon as the operator lets go of the handle the dogs will spring outwardly again and lock the control disc very firmly in place.

There is likelihood of an operator deciding to change the amount of drive on the feed screws when the table has moved part way, and the feed box has stopped. In this position, the stop on the main gear in the feed box will be in contact with either one of the two stop lugs. If it happens to be against the adjustable lug 46, and the operator starts his adjustment while the table is moving the result would be a short additional feed applied to the feed screw, before the table actually moved to a position bringing the work beyond the tools. This short feed would break the tool or injure the work or jam the feed, and should be avoided. We accomplish this by means of the slidable pin in the adjustable stop lug. This pin 47, as has been pointed out, will hold one of the toothed dogs in position of locking the control disc in place. When the lug 28 on the main gear is in contact with the lug 46, it will push the pin outwardly into the recess 55 of the dog. Thus the operator cannot shift the control disc, at the adjusted end of the table movement. The recess in the dog is not so deep but that the pin, which has a rounded top, can be forced out of it by the operator, but he will not do this, if opposed by the presence of the pin, because he will be taught that this is an improper operation. The operator can, however, operate the handle and force the jaw elements to move.

Generally speaking, it is possible to arrange for a very high degree of adjustment, as compared to planers of the past, and there is no necessity of the operator stopping the machine to make an adjustment so long as the table is not moving toward the adjustable stop.

The main friction drive is released, instead of merely permitted to slip. The locking of the adjustable member is immediate and automatic, and requires no special manipulation to release it. The whole device is compact, and simple to put together. The calibration can be made to small fractions of an inch of feed, and the operator can be certain that if he can move the adjustment handle freely, it is safe to make the adjustment that he desires.

Having thus described a typical example of our invention, what we claim as novel therein, and desire to secure by Letters Patent, is:—

1. In a machine tool feed, the combination of a shaft driven alternately in opposite directions, a feed mechanism, transmission between the shaft and the feed mechanism comprising a friction clutch, and means for limiting the movement of the transmission as applied to the feed mechanism, said means including a member to move the friction clutch and said feed mechanism into released position simultaneously.

2. In a machine tool feed, the combination of a shaft driven alternately in opposite directions, a feed mechanism, transmission between the shaft and the feed mechanism comprising a friction clutch, and means for limiting the movement of the transmission as applied to the feed mechanism, said means including a member to move the friction clutch and said feed mechanism into released position, and a residual friction clutch arranged to be in frictional driving position when the first mentioned clutch is released, for the purpose described.

3. A rotary control member for machine tool feeds and like uses comprising a body portion to be rotatively adjusted, and having an operating member thereon, radially movable toothed dogs on said member, an internal toothed member with which said dogs will mesh, and a manipulating handle connected to said dogs, and adapted upon movement in either rotative direction to withdraw the dogs, in the movement of adjusting the said body portion.

4. A friction clutch element forming part of a transmission in feeds of machine tools, as applied to shafts which rotate alternately in opposite directions, comprising a shaft, a member to be driven mounted over the shaft, multiple discs in interposed relation on the shaft and member, a spring arranged to press the member and shaft into position of friction between said discs, means for releasing the spring pressure, and a residual clutch for maintaining constant residual friction intermediate the shaft and member comprising means slidably engaging the member and discs on said means and on the shaft held in frictional relation.

5. In a machine tool feed, the combination of a shaft driven alternately in opposite directions, a feed mechanism, transmission between the shaft and the feed mechanism comprising a friction clutch, and a gear with means for stopping the movement of said gear in both directions of revolution, said means adapted to move the gear axially, and a member energized by such axial movement, and arranged to force the said clutch out of frictional driving relation.

6. In a machine tool feed, the combination of a shaft driven alternately in opposite directions, a feed mechanism, transmission between the shaft and the feed mechanism comprising a friction clutch, and a gear with means for stopping the movement of said gear in both directions of revolution, said means adapted to move the gear axially, and a member energized by such axial movement, and arranged to force the said clutch out of frictional driving relation, and said transmission mechanism comprising in addition a residual friction arranged to remain in driving relation with said gear during periods of release of frictional driving relation of the clutch first mentioned.

7. In a machine tool feed, the combination of a shaft driven alternately in opposite directions, a feed mechanism transmission between the shaft and the feed mechanism comprising a friction clutch, means for limiting the movement of the transmission as applied to the feed mechanism, said means comprising a member to move the friction clutch and said feed mechanism into released position, with a residual friction clutch arranged to remain in constant slight driving relation, so as to operate uniformly on the transmission and to start a return of the parts to driving relation again upon reversal of the shaft following a release of the main friction.

8. In a machine tool feed, the combination of a shaft driven alternately in opposite directions, a feed mechanism transmission between the shaft and the feed mechanism comprising a friction clutch, means for limiting the movement of the transmission comprising stops, adjustable with relation to each other to operate upon the transmission in both directions of rotation, with mechanism energized by said stops for simultaneously throwing the friction clutch and said feed mechanism into released position, upon such stoppage of the transmission.

9. In a machine tool feed, the combination of a shaft driven alternately in opposite directions, a feed mechanism transmission between the shaft and the feed mechanism comprising a friction clutch, means for limiting the movement of the transmission comprising stops, adjustable with relation to each other to operate upon the transmission in both directions of rotation, and mechanism energized by said stops for throwing the friction clutch into released position, upon such stoppage of the transmission, with a residual frictional element in constant driving relation between the shaft and the mechanism, not affected by the release of the clutch, for the purpose described.

10. A feed mechanism for machine tools comprising a driven shaft, adapted to rotate alternately in opposite directions, a transmission, and means rotating with the transmission and serving as a stop, and an element for engaging said stop comprising a fixed stop, and a movable stop lying in the arc of movement of the transmission stop first mentioned, and means for controlling said movable stop comprising a rotary member having radially movable means for holding it automatically in locked position, and an operating member adapted upon manipulation thereof to unlock the rotary member, and move it to desired adjusted position.

11. In an adjustable stop machine tool feed transmission for application of power from a shaft rotating alternately in opposite directions to a feed screw or the like, an adjustment element comprising a housing having an internal toothed member, a disc having a stop thereon and rotatable in the housing, and having a plurality of radially movable toothed members to engage said internal teeth, spring means for forcing said toothed members into engagement with said internal teeth, and common means for releasing said toothed members and rotating the disc.

12. In an adjustable stop machine tool feed transmission for application of power from a shaft rotating alternately in opposite directions to a feed screw or the like, an adjustment element comprising a housing having an internal toothed member, a disc having a stop thereon and rotatable in the housing, and having a plurality of radially movable toothed members to engage said internal teeth, spring means for forcing said toothed members into engagement with said internal teeth, and means for releasing said toothed members and rotating the disc, said last named means formed of a single member in the form of a handle having cam relation to the toothed members, whereby a partial motion will move them out of mesh, and thereafter a continued rotation in engagement with the toothed members will cause the disc to rotate.

13. In a machine tool feed, the combination of a shaft driven alternately in opposite directions, a feed mechanism, transmission between the shaft and the feed mechanism comprising a friction clutch, and a gear, with means for stopping the movement of said gear in both directions of revolution, said means adapted to move the gear axially and a member energized by such axial movement, and arranged to force simultaneously the said clutch and feed mechanism out of friction driving relation, said means moving the gear axially and comprising a stop located on the gear, a fixed stop, and a movable stop, said stops having faces arranged to wedge the said gear away from the fixed and movable stops.

14. In a machine tool feed, the combination of a shaft driven alternately in opposite directions, a feed mechanism, transmission between the shaft and the feed mechanism comprising a friction clutch, and a gear, with means for stopping the movement of said gear in both directions of revolution, said means adapted to move the gear axially, and a member energized by such axial movement, and arranged to force the said clutch out of friction driving relation, said means moving the gear axially and comprising a stop located on the gear, a fixed stop, and a movable stop, said stops having faces arranged to wedge the said gear away from the fixed and movable stops, and said transmission mechanism comprising in addition a residual friction clutch arranged to remain in driving relation with said gear during periods of release of the frictional driving relation of the clutch first mentioned.

15. An adjustable stop machine tool feed transmission for application of power from a shaft rotating alternately in opposite directions to a feed screw or the like, an adjustment element comprising a housing having an internal toothed member, a disc rotatable in the housing and having a plurality of radially movable toothed members to engage said internal teeth, said toothed members formed as sliding plates moving radially of the disc, crosswise channels in the plates, springs for keeping the plates outwardly in position of mesh with the internal teeth, and a handle having pins thereon, and rotatably mounted with relation to the disc, said pins being arranged to enter said slots, and the disc having a stop thereon, the adjustment of which is desired.

16. A feed mechanism for machine tools, the combination of a driven shaft adapted to rotate alternately in opposite directions, a transmission, and means rotating with the transmission and serving as a stop, and an element for engaging said stop comprising a fixed stop, and a movable stop lying in the arc of movement of the transmission stop first mentioned, with means for controlling said movable stop comprising a rotary member having means for holding it automatically in locked position, and an operating member adapted upon manipulation thereof to unlock the rotary member, and move it to desired adjusted position, and means controlled by the contact of the transmission stop with the movable stop, which inhibits the movement of the rotary member.

17. A feed mechanism for machine tools, the combination of a driven shaft, adapted to rotate alternately in opposite directions, a transmission, and means rotating with the transmission and serving as a stop, and an element for engaging said stop comprising a fixed stop, and a movable stop lying in the arc of movement of the transmission stop first mentioned, with means for controlling said movable stop comprising a rotary member having means for holding it automatically in locked position, and an operating member adapted upon manipulation thereof to unlock the rotary member, and move it to desired adjusted position, and means controlled by the contact of the transmission stop with the movable stop, which inhibits the movement of the rotary member, and means mounted in the disc for engaging and preventing movement of the automatic locking means upon contact therewith of the element to be stopped.

18. A transmission feed for machine tools, having transmission, a driving shaft which rotates alternately in opposite directions, a friction drive, means adjustable for inhibiting the drive at a desired point, combined with means controlled by the drive for inhibiting the movement of adjustable means when the friction drive has been inhibited.

19. In a transmission feed for machine tools, the combination with reversing transmission, a fixed and a relatively adjustable stop, a stop on the transmission to engage said stops thereby limiting the feed movement, said adjustable stop being freely movable independent of the movement of the transmission, but locked against movement when the transmission is in engagement with the adjustable stop.

20. In a machine tool feed, the combination with a shaft moving in opposite directions alternately, a transmission comprising a releasable friction clutch, of a constant residual friction clutch, said transmission remaining always in mesh with the member to be driven, and manually controlled movement limiting means consisting solely in devices energized by the transmission and connected to release the friction clutch.

21. In a machine tool feed the combination with a shaft moving in opposite directions alternately, a transmission and means for stopping the movement of the transmission in both directions for permitting a desired feed thereby, said stopping means adjustable independent of the transmission movement, whereby it can be adjusted during the movement of the shaft, of means for preventing movement of the stopping means when the transmission is stopped by the adjustable stopping means and the shaft is still moving.

HARRY L. RAMBO.
THOMAS ADDISON.
GEORGE LANGEN.